(12) United States Patent
Radomski

(10) Patent No.: US 9,771,807 B2
(45) Date of Patent: Sep. 26, 2017

(54) MANUFACTURE OF HOLLOW AEROFOIL

(71) Applicant: ROLLS-ROYCE PLC, London (GB)

(72) Inventor: Steven Aleksy Radomski, Nottingham (GB)

(73) Assignee: ROLLS-ROYCE plc, London (GB)

( * ) Notice: Subject to any disclaimer, the term of this patent is extended or adjusted under 35 U.S.C. 154(b) by 640 days.

(21) Appl. No.: 14/473,425

(22) Filed: Aug. 29, 2014

(65) Prior Publication Data
US 2015/0252675 A1 Sep. 10, 2015

(30) Foreign Application Priority Data
Sep. 20, 2013 (GB) .................. 1316731.7

(51) Int. Cl.
*F01D 5/18* (2006.01)
*B23P 15/04* (2006.01)
*B23K 13/01* (2006.01)
*B23K 20/00* (2006.01)
*B23K 20/02* (2006.01)
(Continued)

(52) U.S. Cl.
CPC .............. *F01D 5/18* (2013.01); *B23K 13/01* (2013.01); *B23K 20/002* (2013.01); *B23K 20/02* (2013.01); *B23K 20/16* (2013.01); *B23P 15/04* (2013.01); *F01D 5/147* (2013.01); *B23K 2201/001* (2013.01); *F05D 2220/32* (2013.01); *F05D 2230/10* (2013.01); *F05D 2230/236* (2013.01); *F05D 2230/51* (2013.01); *F05D 2230/60* (2013.01); *F05D 2230/90* (2013.01); *Y02T 50/672* (2013.01); *Y02T 50/673* (2013.01); *Y02T 50/676* (2013.01); *Y10T 29/49337* (2015.01)

(58) Field of Classification Search
CPC .......... F04D 5/18; F04D 5/147; Y02T 50/672; Y02T 29/49339; B23P 15/04
USPC ...... 29/890.01, 889.71–889.721; 416/229 A, 416/232
See application file for complete search history.

(56) References Cited

U.S. PATENT DOCUMENTS 3,928,901 A * 12/1975 Schilling .............. B21D 26/021
29/505
4,594,761 A 6/1986 Murphy et al.
(Continued)

FOREIGN PATENT DOCUMENTS

GB 1430587 A * 3/1976 ........... B23K 20/233

OTHER PUBLICATIONS

Mar. 28, 2014 Search Report issued in British Application No. GB1316731.7.
(Continued)

*Primary Examiner* — Marina Tietjen
(74) *Attorney, Agent, or Firm* — Oliff PLC

(57) ABSTRACT

A method of manufacturing a hollow aerofoil component (100) for a gas turbine engine (10) comprises using a capping panel (200) to cover a pocket (310) in a pocketed aerofoil body (300). During manufacture, a mandrel (400) is provided to support the capping panel (200) in the correct position. This ensures that the outer surface of the capping panel (200) is located as accurately as possible. This means that the capping panel (200) can be made to be as thin as possible, which in turn reduces weight and material wastage. Remotely detectable elements (700) may be provided to the mandrel (400) to enable the location of the pocket (310) to be accurately determined from outside the aerofoil (100).

19 Claims, 3 Drawing Sheets

(51) Int. Cl.
*B23K 20/16* (2006.01)
*F01D 5/14* (2006.01)
*B23K 101/00* (2006.01)

(56) References Cited

U.S. PATENT DOCUMENTS

| | | | |
|---|---|---|---|
| 5,075,966 A | 12/1991 | Mantkowski | |
| 5,598,610 A * | 2/1997 | Torigoe | A44B 18/0065 24/306 |
| 5,875,549 A * | 3/1999 | McKinley | C23C 14/0005 216/39 |
| 6,078,022 A * | 6/2000 | Dulaney | C21D 10/005 148/525 |
| 6,321,449 B2 * | 11/2001 | Zhao | B23P 15/04 29/890.01 |
| 8,528,208 B2 * | 9/2013 | Rebak | F01D 5/147 29/889.72 |
| 2005/0035183 A1 | 2/2005 | Beckford | |
| 2011/0014060 A1 * | 1/2011 | Bolcavage | F01D 5/288 416/241 R |
| 2011/0179640 A1 * | 7/2011 | Arnold | H01L 24/95 29/825 |

OTHER PUBLICATIONS

May 29, 2015 Search Report issued in European Patent Application No. 1418289.0.

* cited by examiner

MANUFACTURE OF HOLLOW AEROFOIL

CROSS-REFERENCE TO RELATED APPLICATIONS

This application is based upon and claims the benefit of priority from British Patent Application Number 1316731.7 filed 20 Sep. 2013, the entire contents of which are incorporated by reference.

BACKGROUND OF THE INVENTION

1. Field of the Disclosure

The present invention relates to the manufacture of a hollow aerofoil, in particular the manufacture of a hollow aerofoil component for use in a gas turbine engine.

2. Description of the Related Art

Aerofoil shaped components are used throughout gas turbine engines. For example, aerofoil shaped stator vanes and rotor blades are used to guide gas through the engine, for example both in the turbine and the compressor, including the fan and associated guide vanes.

Weight reduction is an important consideration in gas turbine engines, particularly, although not exclusively, for gas turbine engines used to power aircraft. Generally, the lower the weight of the component the better the performance of the aircraft to which it is fitted, for example in terms of fuel consumption. To this end, it is known to use hollow aerofoils, e.g. rotor blades and/or stator vanes, in some stages of gas turbine engines.

One method of producing a hollow aerofoil involves forming the structure using a skin. This involves creating an internal cavity (which may be filled with another, lighter weight, material) using hot creep or super plastic forming processes. Such processes may generate aerofoils with some advantageous properties, such as thin skin thickness and tight dimensional tolerance, but they involve significant material wastage. This material wastage makes these processes expensive, due at least to high material cost for a given size of hollow aerofoil component.

An alternative method for producing hollow aerofoil components involves attaching a plate to an aerofoil structure out of which a pocket has been machined. The plate is placed into the pocket and attached (for example welded or bonded) therein to produce a hollow aerofoil component.

An advantage of producing the hollow aerofoil by using a plate to cover a pocket in an aerofoil structure is that there is less material wastage than using a skin to produce the hollow aerofoil. However, the dimensional tolerances are not so accurate. This may be because distortion is introduced in the process of attaching the plate to the pocketed aerofoil, which typically involves local heating at the interface between the plate and the pocketed aerofoil. Additionally, tolerance errors may "stack-up" in the process used to produce the pocketed aerofoil, the process used to produce the plate, and the process/feature used to locate the plate into position in the pocket, which typically involve placing the plate onto a supporting ledge inside the pocket.

The lack of dimensional accuracy means that the plate generally has to be manufactured to be thicker than would otherwise be required. For example, the extra thickness may be required in order to ensure that there is enough material to be machined back to produce the desired aerofoil shape after it has been fixed into the pocket. Without the extra thickness, the dimensional variation resulting from tolerance "stack-up" and/or distortion may mean that there is not sufficient material to produce the desired aerofoil shape in some of the aerofoils produced by the method.

However, this extra thickness means both that the component is heavier than it would otherwise need to be, and also that there is more material wastage.

OBJECTS AND SUMMARY

It is therefore desirable to manufacture hollow aerofoil components by using a plate to cover a pocket (so as to take advantage of the generally lower material wastage), but with improved dimensional tolerance.

According to an aspect, there is provided a method of manufacturing a hollow aerofoil comprising:
providing a pocketed aerofoil body having an open pocket formed in a surrounding hollowed surface;
placing a temporary mandrel into the pocket of the pocketed aerofoil body;
locating a capping panel over the pocketed aerofoil body and temporary mandrel, the capping panel having an inner surface and an opposing outer surface;
joining a first region of the inner surface of the of the capping panel to the surrounding hollowed surface of the pocketed aerofoil body so as to form the hollow aerofoil; and
removing the temporary mandrel from the hollow aerofoil after the step of joining. The entire temporary mandrel may be removed from the hollow aerofoil.

The temporary mandrel is shaped so as to support the capping panel over a second region of its inner surface during the joining, such that the outer surface of the capping panel forms a desired aerodynamic surface of the hollow aerofoil.

According to such a method, the capping panel is supported during joining by the temporary mandrel, meaning that the shape of the capping panel is accurately controlled during the manufacture. This means that a hollow aerofoil can be manufactured with good dimensional accuracy (i.e. to tight tolerance), with minimal residual stress. Because of the good dimensional accuracy, the aerofoil (including the capping panel) can have thinner walls than would be possible with conventional methods, thereby reducing material wastage, manufacture time, and the overall cost and/or weight of the hollow aerofoil.

Furthermore, using a thinner capping panel may reduce the amount of input power required in the joining step. In turn, this means that the amount of distortion produced in the joining process may be reduced, resulting in a more accurate profile that may require less (or no) machining to produce the finished aerofoil surface.

The capping panel may be supported by the temporary mandrel during the joining step such that it is held in a position in which it forms a continuous aerodynamic surface with the pocketed aerofoil body.

The capping panel may form part of the gas-washed surface of the manufactured hollow aerofoil, for example either a pressure surface or a suction surface of an aerofoil. When the capping panel is located in position, it may cover at least a part of (for example all of) the surrounding hollowed surface.

The temporary mandrel may comprise at least one detectable element whose location is remotely detectable. Such a remotely detectable element may allow the position of the temporary mandrel to be detected relative to the hollow aerofoil, for example even when it is covered by the capping panel. Such a detectable element may be detectable (for example using suitable detection apparatus) when not visible. Accordingly, the detectable element may allow the position of the void in the hollow aerofoil to be determined from outside the hollow aerofoil, for example in relation to external surfaces of the hollow aerofoil. Equally, the detectable element mat allow the external surfaces to be referenced (for example defined) relative to the temporary mandrel.

The temporary mandrel may comprise at least three such detectable elements. Three or more detectable elements may, in some cases, allow the position of the temporary mandrel to be determined particularly accurately, for example particularly accurately in three dimensions.

Any suitable detectable element may be used. For example, the or each detectable element may be magnetic. Such magnetic detectable elements may be detected using Hall effect sensors, for example. Such a detectable element may be detected in any suitable manner, for example using magnetic, radio frequency (RF) and/or ultrasonic detectors. By way of non-limitative example, other types of detectable elements that could be used include sensor coils.

Detectable elements may be provided in any suitable manner. For example, they may be provided to the temporary mandrel as separate elements and/or they may be formed integrally with the temporary mandrel.

The step of locating the capping panel may comprise detecting the or each detectable element so as to accurately position capping panel relative to the temporary mandrel. In this way, the capping panel may be positioned accurately relative to the void in the finished hollow aerofoil. This accurate positioning may allow the capping panel to have thinner wall thickness, because less machining may be required after joining the capping panel to the pocketed aerofoil body in order to achieve the desired shape.

The method may comprise machining an outer surface of the hollow aerofoil after the step of joining but before the step of removing the temporary mandrel. As such, the mandrel may continue to provide support to the capping panel during any such machining step, thereby ensuring that it is retained in the desired position.

Where a machining step is used, it may be based at least in part on the position of the or each detectable element. Thus, the machining may be based at least in part on the position of the temporary mandrel (the position of which may be known accurately from the detectable element), and thus also based at least in part on the position of the resulting void left in the hollow aerofoil once the temporary mandrel has been removed. The detectable element(s) may be said to act as a datum for a machining step.

The joining step may comprise diffusion bonding. The joining step may involve diffusion bonding the first region of the inner surface of the capping panel to the hollowed surface of the pocketed aerofoil body. Using diffusion bonding has the advantage of producing a strong joint that is free from residual stress.

The method may comprise locating one or both of the capping panel and the pocketed aerofoil body in a respective fixture prior to the joining step, for example prior to a diffusion bonding step. This may be a particularly convenient way to locate (and optionally subsequently hold) the capping panel relative to the hollowed surface of the pocketed aerofoil body into the position for joining the two together.

Where one or more fixtures is used, pressure may be applied to and/or through the respective fixture or fixtures so as to perform diffusion bonding.

Where one or more fixtures is used, the method may comprise heating the or each respective fixture so as to perform diffusion bonding. The heating of the fixtures may be before and/or during any pressure is applied during the diffusion bonding.

The joining step may comprise liquid interface diffusion (LID) bonding (which may be referred to as liquid activated diffusion bonding). The method may comprise providing an interface foil layer between the surfaces being bonded, for example between part or all of the first region of the inner surface of the capping panel and the surrounding hollowed surface of the pocketed aerofoil body in or to facilitate the liquid interface diffusion bonding.

The temporary mandrel may be substantially incompressible throughout the joining step. Such an incompressible core would ensure that the temporary mandrel retains the desired shape throughout the joining process, and thus that the cover plate is supported in and/or forms the desired shape during the joining step.

The temporary mandrel may be constructed and/or arranged such that it can be activated so as to urge the capping panel away from the pocket. For example, where the capping panel is located in a fixture, the capping panel may be urged towards the fixture by such a temporary mandrel when it is activated. By way of example, the temporary mandrel may comprise a cavity that may be sealed using a flexible material, for example it may not allow gas to pass therethrough, i.e. it may be impermeable. Such a cavity may be filled with a gas, for example a non-reactive or inert gas. Activation of such a temporary mandrel may comprise generating a pressure differential across the flexible material containing the gas so that it is urged to expand, and thus act on the capping panel to urge it away from the pocket. Such a pressure differential may be generated by increasing the pressure inside the cavity, for example by heating.

The temporary mandrel may be coated with a material comprising a rare earth element oxide. This may prevent interaction between the temporary mandrel material and the pocketed aerofoil body or capping panel, including preventing contamination of the pocketed aerofoil body or capping panel and the material of the temporary mandrel. For example, the temporary mandrel may be coated with an oxide of yttrium.

Purely by way of example, a suitable material for the temporary mandrel may comprise ceramic and/or rammed graphite.

The temporary mandrel may be formed in any suitable manner, for example using injection moulding and/or compression moulding.

Any suitable technique may be used to remove the temporary mandrel from the hollow aerofoil, for example ultrasonic shattering or leeching.

The method of manufacturing a hollow aerofoil may further comprise filling the hollow aerofoil with a core material after the step of removing the temporary mandrel. The core material may be a permanent core material. The core material may have different properties from the temporary mandrel, for example it may be less dense and/or have better vibration absorption characteristics. The core material may be a lightweight filling medium. Thus, the method and apparatus described herein may be used to manufacture a filled aerofoil, and so references herein to the manufacture of a hollow aerofoil should be taken to include the manufacture of an aerofoil that is filled with a core material, i.e. a filled aerofoil.

The method may comprise machining a pocket into an aerofoil blank in order to produce the pocketed aerofoil body. The method may comprise forming the aerofoil blank, for example by forging. Alternatively, the pocketed aerofoil body may be formed in any other suitable way, for example comprising a casting process, and the method may comprise such a process for forming the pocketed aerofoil body.

According to an aspect of the invention, there is also provided an aerofoil manufactured according to the method described above and elsewhere herein. Such an aerofoil may be an aerofoil for a gas turbine engine. Such an aerofoil may be (or may form a part of), for example, a rotating blade or a stationary vane. Such an aerofoil may be a part of a compressor or a turbine. Purely by way of example, such an aerofoil may be an outlet guide vane of a turbofan gas turbine engine.

According to an aspect of the invention, there is provided a gas turbine engine comprising an aerofoil (or aerofoil component) manufactured using a method as described above and elsewhere herein in relation to the present invention.

BRIEF DESCRIPTION OF THE DRAWINGS

Embodiments of the invention will now be described by way of example only, with reference to the accompanying diagrammatic drawings, in which.

DETAILED DESCRIPTION OF THE PREFERRED EMBODIMENTS

Figure 1:
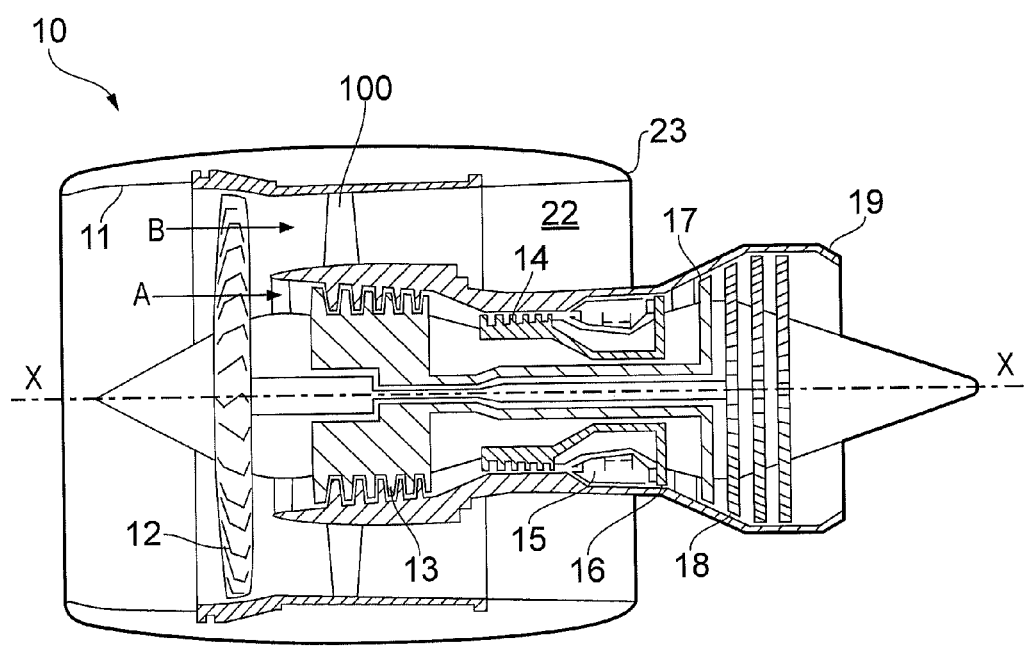
FIG. 1 is a schematic sectional side view of a gas turbine engine.

With reference to FIG. 1, a ducted fan gas turbine engine generally indicated at 10 has a principal and rotational axis X-X. The direction X-X may be referred to as the axial direction of the engine. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B (which may be referred to as a bypass flow B) which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

As the air passes through the gas turbine engine 10 it is heated to high temperatures. In particular, the first airflow A reaches high temperatures as it passes through the core of the engine. Typically, particularly high temperatures may be reached at the exit of the combustion equipment 15, and as the air subsequently passes through the high, intermediate and low-pressure turbines 16, 17, 18.

The gas turbine engine 10 comprises outlet guide vanes (OGVs) 100 extending across the bypass duct 22, which therefore sit in the bypass flow B. Each OGV 100 takes the form of a large stator vane, and thus may be referred to as an aerofoil or aerofoil component 100. A plurality of OGVs 100 is typically provided as an annular array in the bypass duct 22.

Because each OGV 100 is an especially large aerofoil component, it is particularly advantageous to reduce its weight. Thus, the OGV 100 in the gas turbine engine 10 is hollow.

Figure 2:
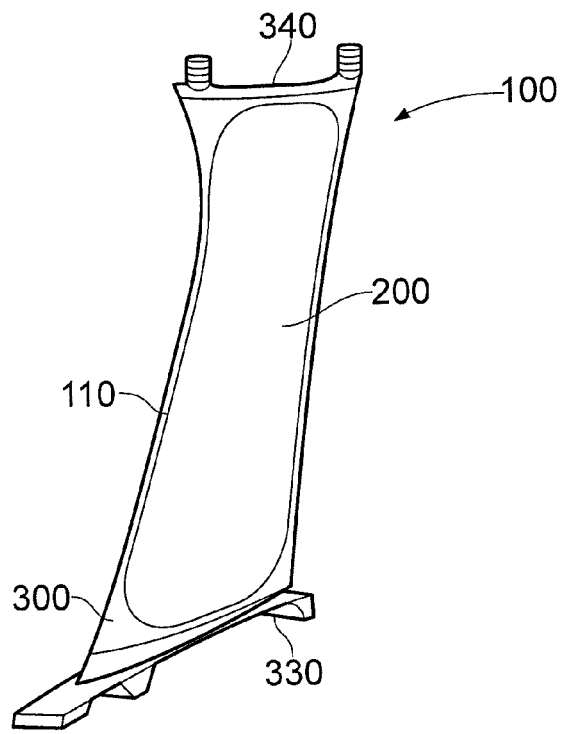
FIG. 2 is a schematic perspective view showing a hollow aerofoil in accordance with the invention.

FIG. 2 is a schematic of a hollow aerofoil in accordance with the invention. In the FIG. 2 example, the hollow aerofoil is a hollow outlet guide vane (OGV) 100. The hollow OGV 100 is manufactured by joining a capping panel 200 to a pocketed aerofoil body 300. The capping panel 200 and the pocketed aerofoil body 300 may be any suitable material, for example metallic and/or composite, and may be the same or different materials.

In FIG. 2, the interface between the pocketed aerofoil body 300 and the capping panel 200 is indicated by the line 110. However, it will be appreciated that after manufacture of the hollow aerofoil 100, the join between the original capping panel 200 and the pocketed aerofoil body 300 will be seamless, and may not be visible. As such, the line 110 in FIG. 1 is shown merely for the purpose of indicating an example of the position of the original interface between the capping panel 200 and the pocketed aerofoil body 300 prior to the joining and optional finishing of the hollow aerofoil 100. Furthermore, it will be appreciated that the extent of the capping panel 200 is not limited to that illustrated by the line 110 in FIG. 2, which is merely illustrative.

In the example shown in FIG. 2, the hollow OGV comprises an inner attachment 330 (which may be a platform) and an outer attachment 340, which may be used to attach the finished OGV 100 to the rest of the gas turbine engine. Such inner and outer attachments 330, 340 may be a part of the pocketed aerofoil body 300. However, it will be appreciated that some pocketed aerofoil bodies 300 may not include one or both of the inner attachment 330 and outer attachment 340. For example, the inner and/or outer attachments 330/340 may be separate features that may be attached to the hollow aerofoil 100 (for example by welding) after the capping panel 200 and the pocketed aerofoil body 300 have been joined together.

Figure 3:
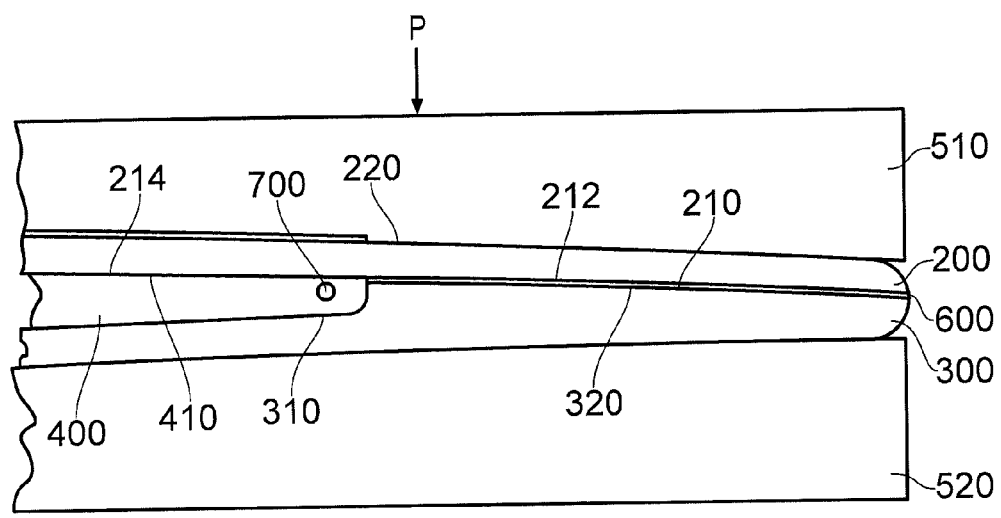
FIG. 3 is a schematic cross-section through a capping panel, pocketed aerofoil body and temporary mandrel during manufacture of a hollow aerofoil.
Figure 4:
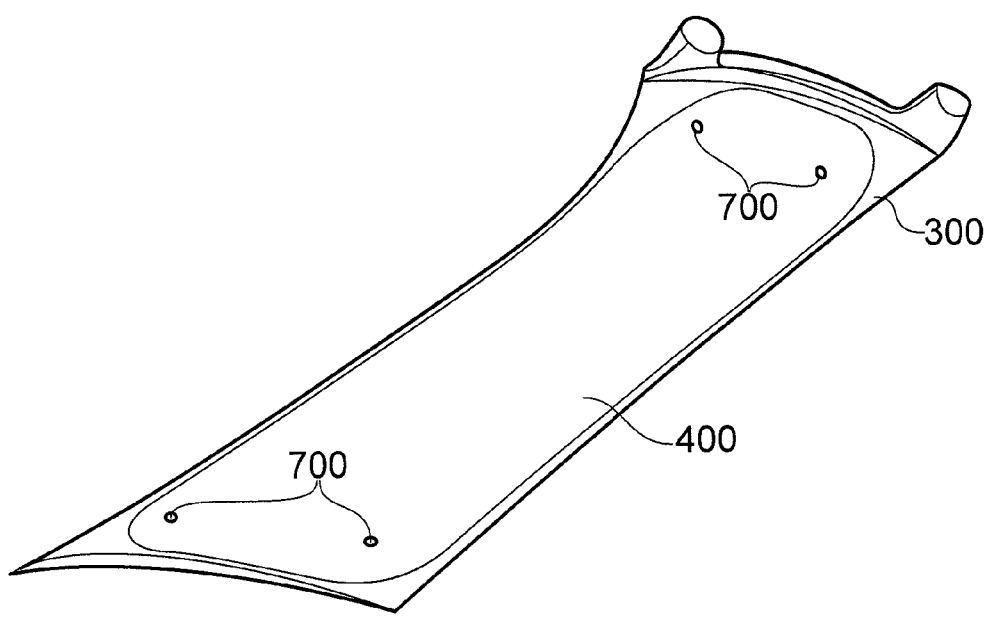
FIG. 4 is a schematic perspective view showing a pocketed aerofoil body and a temporary mandrel having detectable elements.

FIG. 3 shows a close-up cross sectional view of the capping panel 200 being joined to the pocketed aerofoil body 300 during manufacture of the hollow OGV 100. FIG. 4 also shows a temporary mandrel 400, which is explained in greater detail elsewhere herein. It will be appreciated that FIG. 3 shows only a part of the capping panel 200, pocketed aerofoil body 300, and temporary mandrel 400, and that the full parts extend in the chordwise direction, to the left in FIG. 3.

As shown in FIG. 3, the pocketed aerofoil body 300 comprises a pocket 310 which, prior to being covered by the capping panel 200, is an open pocket 310. The pocket 310 is formed in, and surrounded by, a surrounding hollowed surface 320.

During manufacture, a mandrel 400 is positioned in the pocket 310. The mandrel 400 may also be referred to as a core 400, or a temporary core 400. The mandrel 400 is arranged, for example sized and/or shaped, so as to support the capping panel 200 during manufacture. The mandrel 400, for example an upper (or outer) surface 410 of the mandrel 400, may support the capping panel 200 over all, or substantially all, of the pocket 310, as shown in the FIG. 3 example. In this regard, the capping panel 200 has an inner surface 210 that has a first portion 214 that is supported by the mandrel 400.

In the FIG. 3 example, the capping panel 200 is held in a capping panel fixture 510, and the pocketed aerofoil body 300 is held in an aerofoil body fixture 520. During manufacture, a diffusion bonding process is used to join the capping panel 200 to the pocketed aerofoil body 300. Using a diffusion bonding process may help to ensure that the resulting joint is free from residual stress. However, it will be appreciated that other joining process could be employed.

In the FIG. 3 example, the surrounding hollowed surface 320 of the pocketed aerofoil body 300 is joined to an opposing, or adjacent, portion 212 of the inner surface 210 of the capping panel 200 by diffusion bonding. The diffusion bonding may follow any suitable process. For example, the capping panel 200 and the pocketed aerofoil body 300 may be pressed or forced together, for example by applying pressure P through one or more of their respective fixtures 510, 520. The diffusion bonding typically comprises raising the temperature of the pocketed aerofoil body 300 and the capping panel 200, at least in the regions being joined. The heating energy used to raise the temperature may, for example, be applied through their respective fixtures 510, 520.

A liquid interface diffusion (LID) bonding process may be used to join the pocketed aerofoil body 300 and the capping panel 200 together. Indeed, this is the joining process that is illustrated in FIG. 3. As such, the FIG. 3 arrangement includes an interface foil layer 600 between the surrounding hollowed surface 320 of the pocketed aerofoil body 300 and the opposing portion 212 of the inner surface 210 of the capping panel 200. The interface foil layer 600 may comprise copper and/or silver and/or nickel, or indeed any other material that may be used in a LID bonding process.

As mentioned elsewhere herein, during the joining process, the mandrel 400 supports the capping panel 200. In particular, the mandrel 400 supports the first portion 214 of the inner surface 210 of the capping panel during the joining process in a position such that the outer surface 220 of the capping panel 200 maintains (or is held in) the desired position. In this regard, the desired position may be that position in which the outer surface 220 takes the correct shape to form an aerodynamic surface of the finished hollow OGV 100, such as at least a part of the pressure surface or suction surface, optionally allowing for a slight change in shape resulting from an optional finishing step. Also as shown in the FIG. 3 example, once the capping panel 200 has been positioned onto the surrounding hollowed surface 320, the surrounding hollowed surface 320 may no longer form an external surface of the aerofoil 100.

To this end, the mandrel 400 may be substantially incompressible throughout the joining process. For example, the mandrel 400 may be substantially incompressible even when subjected to elevated pressure and/or temperature resulting from a diffusion bonding process. The mandrel may, for example, comprise ceramic or graphite. As an alternative to being substantially incompressible, the mandrel 400 may experience a degree of compression or deformation during the manufacture of the hollow OGV 100, but in that case the compression/deformation would be specifically designed to ensure that the capping panel 200 is retained in the desired position during welding.

During manufacture (for example during a diffusion bonding process), the capping panel 200 (and possibly the pocketed aerofoil body 300) may soften. As such, the shape of the capping panel 200 may be defined at least in part by the mandrel 400 on which it is supported. As such, the mandrel 400 may at least in part define the shape of the capping panel 200, for example the shape of the inner surface 210 and/or the outer surface 220 of the capping panel 200. Even where the capping panel 200 does not soften appreciably during manufacture, its shape may be at least in part defined by the mandrel 400. For example, the support provided by the mandrel 400 may prevent the capping panel 400 from sagging during manufacture. The tooling 510, 520 may also at least in part define the external shape of the finished hollow OGV 100.

The mandrel 400 may be precision formed so as to ensure that the capping panel 200 takes the desired shape. Any suitable process may be used to form the mandrel 400, such as injection moulding and/or compression moulding.

In order to avoid unwanted reaction between the mandrel 400 and the capping panel 200 and/or the pocketed aerofoil, the mandrel may be coated with an unreactive material, such as a rare earth oxide, such as yttria.

The mandrel 400 of FIG. 3 comprises a detectable element 700 that is detectable even when not visible. In the example of FIG. 3, the detectable element 700 is a magnetic element (for example a metallic sphere). The position of such a magnetic element 700 may be detected by, for example, a Hall effect sensor or a Reed sensor. However, other remotely detectable sensors may be used, such as sensor coils or trace paints.

The position of the detectable element 700 in relation to the mandrel 400 is known accurately. As such, detection of the position of the detectable element 700 allows accurate determination of the position of the mandrel 400 in the pocket 310, even when it is covered by the capping panel 200, and thus not visible. In turn, this allows accurate determination of the position of the pocket 310 within the hollow OGV once the capping panel 200 and the pocketed aerofoil body 300 have been joined.

FIG. 4 is a schematic showing an example of a mandrel 400 in a pocketed aerofoil body 300 prior to the capping panel 200 being introduced. In the FIG. 4 example, the mandrel 400 is provided with four detectable elements 700. Any number of detectable elements 700 may be provided to the mandrel 400, but as the number of detectable elements 700 increases, so the accuracy with which the location of the mandrel 400 may increase. Thus, for example, whilst a mandrel 400 may be provided with one or two detectable elements 700, providing three, four, five or more than five detectable elements 700 may be advantageous in this regard.

Precise knowledge of the position of the mandrel 400, and thus of the internal definition of the pocket 310, allows the capping panel 200 to be accurately located. This means that the wall thickness of the capping panel can be reduced, because the positional variability and thus the required tolerance can be reduced. This results in a lighter component with less material wastage.

Precise knowledge of the position of the mandrel 400, and thus of the internal definition of the pocket 310, may allow any finishing or post-joining machining to be datumed to the internal pocket 310 geometry/position. Again, this may reduce the required tolerance in wall thickness, and thus allow a reduced wall thickness to be used.

The mandrel 400 may remain in the aerofoil 100 during any post-joining process, such as machining, finishing, and/or heat treatment. This may ensure that the capping panel 200 retains the correct position and/or shape throughout such processes.

After manufacture of the hollow OGV 100 (for example after joining the capping panel 200 and the pocketed aerofoil body together, or after any optional post-joining processes have been finished), the mandrel 400 is removed from inside the OGV, leaving a hollow pocket 310. As such, the mandrel 400 may be referred to as a temporary mandrel 400. The temporary mandrel 400 may be removed by any suitable techniques, such as ultrasonic destruction or chemical etching. The temporary mandrel 400 may be removed via an opening (which may commonly be referred to as a "letter-box") in the OGV 100.

Optionally, the void, or pocket, 310 remaining after the mandrel 400 has been removed may be at least partially (for example completely) filled using a core material. Such a core material may have properties that provide advantages during use of the aerofoil 100, such as high vibration damping and light weight. Thus, such a core would typically have different properties to the temporary mandrel 400.

Although the invention has largely been described herein in relation to an OGV 100, it will be appreciated that it could be applied to any aerofoil or aerofoil component, such as any rotor blade or stator vane, for example for use in a turbine, compressor, or other aerofoil-shaped component of a gas turbine engine It will be appreciated that many designs and/or arrangements of features, such as capping panel 200, pocketed aerofoil body 300 or mandrel 400, other than those shown in and described in relation to FIGS. 1 to 4 and not explicitly described herein fall within the scope of the invention. Furthermore, any feature described and/or claimed herein may be combined with any other compatible feature described in relation to the same or another embodiment.

I claim:

1. A method of manufacturing a hollow aerofoil comprising:
   providing a pocketed aerofoil body having an open pocket formed in a surrounding hollowed surface;
   placing a temporary mandrel into the open pocket of the pocketed aerofoil body;
   locating a pre-formed capping panel over the pocketed aerofoil body and the temporary mandrel, the pre-formed capping panel having an inner surface and an opposing outer surface;
   joining a first region of the inner surface of the pre-formed capping panel to the surrounding hollowed surface of the pocketed aerofoil body so as to form the hollow aerofoil; and
   removing the temporary mandrel from the hollow aerofoil after the step of joining, wherein
   the temporary mandrel is shaped so as to support the pre-formed capping panel over a second region of the inner surface during the joining, such that the outer surface of the pre-formed capping panel forms a desired aerodynamic surface of the hollow aerofoil.

2. The method of manufacturing a hollow aerofoil according to claim 1, wherein the joining step comprises diffusion bonding the first region of the inner surface of the pre-formed capping panel to the surrounding hollowed surface of the pocketed aerofoil body.

3. The method of manufacturing a hollow aerofoil according to claim 2, further comprising:
   locating one or both of the pre-formed capping panel and the pocketed aerofoil body in a respective fixture prior to the diffusion bonding step; and
   applying pressure to the respective fixture or fixtures so as to perform the diffusion bonding.

4. The method of manufacturing a hollow aerofoil according to claim 3, further comprising heating the or each respective fixture so as to perform the diffusion bonding.

5. The method of manufacturing a hollow aerofoil according to claim 1, wherein:
   the joining step comprises liquid interface diffusion bonding; and
   the method further comprises providing an interface foil layer between the first region of the inner surface of the pre-formed capping panel and the surrounding hollowed surface of the pocketed aerofoil body in order to facilitate the liquid interface diffusion bonding.

6. The method of manufacturing a hollow aerofoil according to claim 1, wherein the temporary mandrel is substantially incompressible throughout the joining step.

7. The method of manufacturing a hollow aerofoil according to claim 1, wherein the temporary mandrel is coated with a material comprising a rare earth element oxide so as to prevent interaction between the temporary mandrel material and the pocketed aerofoil body or the pre-formed capping panel.

8. The method of manufacturing a hollow aerofoil according to claim 1, wherein the temporary mandrel comprises ceramic and/or rammed graphite.

9. The method of manufacturing a hollow aerofoil according to claim 1, wherein the step of removing the temporary mandrel from the hollow aerofoil comprises ultrasonic shattering or leeching.

10. The method of manufacturing a hollowed aerofoil according to claim 1, further comprising machining the pocket into an aerofoil blank in order to produce the pocketed aerofoil body.

11. A method of manufacturing an aerofoil comprising:
    manufacturing a hollow aerofoil according to the method of claim 1; and
    filling the hollow aerofoil with a core material after the step of removing the temporary mandrel.

12. An aerofoil manufactured according to the method of claim 1.

13. A gas turbine engine comprising an aerofoil according to claim 12.

14. A method of manufacturing a hollow aerofoil, comprising:
    providing a pocketed aerofoil body having an open pocket formed in a surrounding hollowed surface;
    placing a temporary mandrel into the open pocket of the pocketed aerofoil body;
    locating a capping panel over the pocketed aerofoil body and the temporary mandrel, the capping panel having an inner surface and an opposing outer surface;
    joining a first region of the inner surface of the capping panel to the surrounding hollowed surface of the pocketed aerofoil body so as to form the hollow aerofoil; and
    removing the temporary mandrel from the hollow aerofoil after the step of joining, wherein
    the temporary mandrel is shaped so as to support the capping panel over a second region of the inner surface during the joining, such that the outer surface of the capping panel forms a desired aerodynamic surface of the hollow aerofoil, and the temporary mandrel comprises at least one detectable element whose location can be detected remotely.

15. The method of manufacturing a hollow aerofoil according to claim 14, wherein the temporary mandrel comprises at least three such detectable elements.

16. The method of manufacturing a hollow aerofoil according to claim 14, wherein the detectable element is magnetic.

17. The method of manufacturing a hollow aerofoil according to claim 14, wherein the step of locating the capping panel comprises detecting the or each detectable element so as to accurately position the capping panel relative to the temporary mandrel.

18. The method of manufacturing a hollow aerofoil according to claim 14, further comprising:

machining an outer surface of the hollow aerofoil after the step of joining but before the step of removing the temporary mandrel, wherein the machining step is based at least on part on the position of the or each detectable element.

19. A method of manufacturing a hollow aerofoil, comprising:

providing a pocketed aerofoil body having an open pocket formed in a surrounding hollowed surface;

placing a temporary mandrel into the open pocket of the pocketed aerofoil body;

locating a capping panel over the pocketed aerofoil body and the temporary mandrel, the capping panel having an inner surface and an opposing outer surface;

joining a first region of the inner surface of the capping panel to the surrounding hollowed surface of the pocketed aerofoil body so as to form the hollow aerofoil; and removing the temporary mandrel from the hollow aerofoil after the step of joining, wherein the temporary mandrel is shaped so as to support the capping panel over a second region of the inner surface during the joining, such that the outer surface of the capping panel forms a desired aerodynamic surface of the hollow aerofoil;

the temporary mandrel comprises an impermeable cavity defined by a flexible material and containing gas; and the method further comprises locating the capping panel in a fixture and generating a pressure differential across the flexible material so that it urges the capping panel in a direction away from the pocket.

* * * * *